Dec. 20, 1932.  F. X. REISINGER, JR  1,891,335
AUTOMATIC LUBRICATION ANNUNCIATOR FOR MOTOR VEHICLES
Filed Aug. 12, 1930
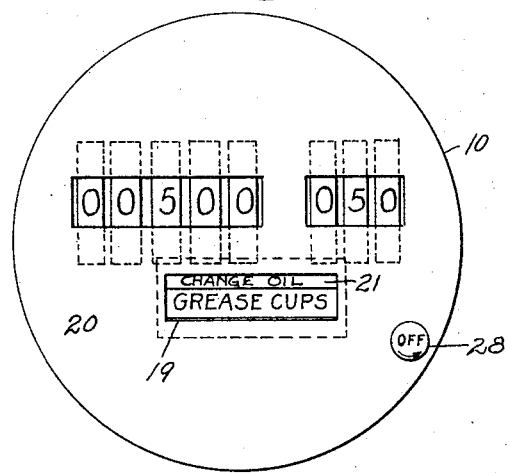
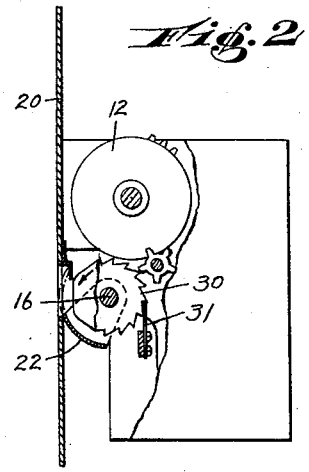
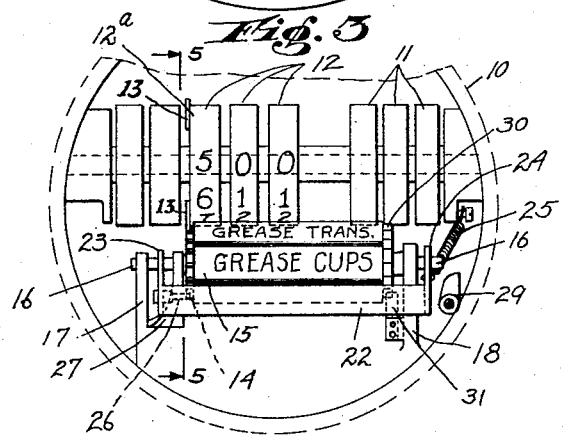
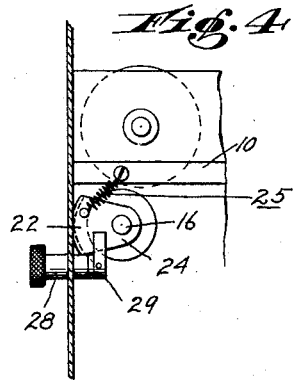
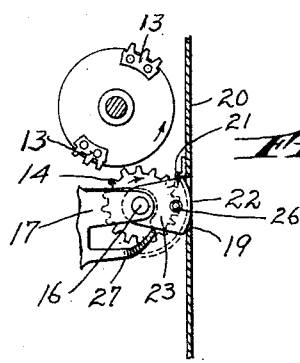
INVENTOR.
Frank X. Reisinger Jr.
BY
ATTORNEY Patented Dec. 20, 1932

1,891,335

UNITED STATES PATENT OFFICE

FRANK X. REISINGER, JR., OF SCHENECTADY, NEW YORK

AUTOMATIC LUBRICATION ANNUNCIATOR FOR MOTOR VEHICLES

Application filed August 12, 1930. Serial No. 474,704.

This invention relates to devices for announcing through a warning sign or symbol the necessity of lubricating various parts or mechanisms of a motor vehicle or other apparatus in connection with which the device is employed, such for example as stationary engines, aeroplanes, motor boats and various other kinds and classes of apparatus, requiring periodical lubrication such for example as in the replacement of oil, the filling of oil and grease cups, and in the replacement of grease in various devices or mechanisms; and the object of the invention is to provide a device of the class and for the purpose specified, which is preferably arranged in conjunction with a mileage or other indicating device, such for example as an odometer and placed in operative connection therewith in such manner that when the odometer or other mechanism reaches predetermined indications thereon, such for example as the number of miles traveled by the vehicle, said indicator will be actuated to announce through a sign or other signal element, the lubricating operations which should be performed at the prevailing time; a further object being to provide a device of the class specified, which in operating in conjunction with and through the medium of the odometer dials, or at least one of said dials, will cause said announcing or signal device to be moved into operative position at each five hundred miles traveled by the vehicle or any other increment of mileage desired, and to indicate at such periods, the necessity of changing oil employed in the motor of a vehicle, and other successive lubricating operations which should be performed on various other parts of the vehicle; a further object being to provide means for closing or rendering the annunciating sign or element inoperative, after the oiling and greasing operations have been performed; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic, face view of an odometer illustrating my improved annunciating device in conjunction therewith.

Fig. 2 is a transverse, sectional view through the device as seen in Fig. 1, showing only portions of the odometer.

Fig. 3 is a face view of the odometer with the front plate removed, and diagrammatically illustrating the manner of coupling the annunciating device with one of the dial wheels of the odometer.

Fig. 4 is an end view of the device as seen in Fig. 3; and,

Fig. 5 is a partial section on the line 5—5 of Fig. 3.

For the purpose of illustrating one use of my invention and one method of carrying the same into effect, I have diagrammatically illustrated in the drawing, the portions of an odometer of conventional form as commonly employed in connection with motor vehicles and consisting of a suitable casing 10, in which is arranged three trip mileage dials or disks 11 and five registering dials or disks 12, two of which are operated from a rotatable part of the vehicle in the usual or any desired manner to register the number of miles traveled by the vehicle, the dial or disk 12a representing the registration of hundred miles. Mounted on this disk are two gear segments 13 arranged in opposed relation and in such manner as to engage and operate a gear 14 at one side of an annunciating drum or cylinder 15 when the dial 12a registers each five hundred miles traveled by the vehicle. In other words, one of the gear segments 13 will operate the gear 14 at five hundred miles and the other segment at one thousand miles, and the first again at fifteen hundred miles, etc.

The cylinder 15 has projecting trunnions 16 at the ends thereof, arranged in suitable bearings 17 and 18 formed in the housing or casing 10 of the odometer in such manner as to arrange the cylinder in registering position with a window or opening 19 formed in the front plate 20 of the odometer.

Supported rearwardly of the window 19 adjacent the upper edge thereof and arranged longitudinally of this edge, is an inwardly and downwardly directed stop 21, the outer face of which has arranged thereon a suitable annunciating phrase such as "Change oil" which is clearly visible through the window 19 when a shutter plate 22 is moved into inoperative position. The plate 22 is arc-shaped in cross sectional form and extends throughout the full width of the opening or window 19 and is provided at its ends with arms 23 and 24 mounted on the trunnions 16 to permit the swinging movement of said plate thereon. A spring 25 is attached to the arm 24 and to a part of the casing 10 as seen in Figs. 3 and 4 of the drawing to normally support the shutter plate 22 in raised position against the stop 21 and to cover the phrase "Change oil" thereon. This spring also serves to hold a pin 26 arranged on the inner face of the arm 23 in engagement with the teeth of the gear 14 to lock the shutter plate 22 in connection with said gear and with the cylinder 15 so that the rotation of the cylinder will correspondingly rotate said plate.

Adjacent the arm 23, the frame 17 has a forwardly and upwardly extending cam 27 over which the arm 23 passes when the plate 22 is moved into open position so that in the event that the shutter plate 22 has not been returned to closed position during any period of five hundred miles, the rotation of the cylinder 15 through the gear 14 will cause the pin 26 to be moved out of engagement with the gear 14. On the completion of the partial revolution of the cylinder 15, the spring 25 will return the pin 26 into engagement with said gear, moving the arm 23 upwardly and inwardly on the cam 27.

To return the shutter plate 22 into normal or closed position after the operations of oiling and greasing have been performed by the owner or operator of the vehicle, a knob 28 is rotated anti-clockwise and this arm carries a cam head 29 which operates upon the arm 24 to move the shutter plate to the left to disengage the pin 26 from the gear 14, thus permitting the spring 25 to return said plate into its closed position as seen in full lines in Fig. 5 of the drawing. When in this position, the knob 28 is turned clockwise into inoperative position, allowing the pin 26 to re-engage the gear 14 so that when the known five hundred mile travel of the vehicle is reached, the plate 22 will again be moved into open position to expose the cylinder 15 through the window or opening 19 and to again expose the phrase "Change oil".

Arranged on different longitudinal sections of the cylinder 15 are phrases, such for example, as "Grease cups", "Grease trans" meaning grease transmission, etc., and these phrases may refer to a construction sheet or chart advising the owner or operator of the vehicle, just what lubricating operations should be performed when said annunciating phrases are brought to view in the window or opening 19 by the successive, intermittent, rotary movements imparted to the cylinder at each five hundred miles traversed by the vehicle, but at all times, the opening of the window 19 will expose the words "Change oil", which instructs the operator to change the motor oil as is desirable to maintain proper operating conditions of motor vehicles.

At the end of the cylinder adjacent the bearing 18 is a ratchet wheel 30 in connection with which a spring pawl 31 is adapted to operate to allow the cylinder 15 to be rotated in one direction only, namely in the direction in which rotary movement is transmitted thereto through the gear segments 13.

It will be understood at this time, that my invention is not necessarily limited to the specific miles per hour traveled by the vehicle for automatically actuating the means for indicating the lubricating operations to be performed, and this may be varied to suit the type and class of vehicle in connection with which the device is employed. In some instances, this lubricating change or requirement may be made and based on the number of operations of the apparatus in connection with which the device is employed, such for example as the number of rotations of the engine or the number of operations performed by any suitable machine or apparatus; it being understood that my invention is not limited in its use to the motors of vehicles of the class specified, nor am I necessarily limited to the use of an odometer, as the invention may be applied directly or indirectly in connection with indicating and recording devices of any kind or class.

While I have shown certain details of construction for carrying my invention into effect, it will be understood that I am not necessarily limited to these details, and various changes therein and modifications thereof may be made within the scope of the appended claims without departing from the spirit of my invention or sacrificing its advantages.

Having fully described my invention, what I claim as new and desire to secure by Letters Patent, is:—

1. A device of the class described comprising a casing, a cylinder rotatably supported in said casing and having circumferentially spaced sections arranged thereon and extending longitudinally thereof, each of said sections being adapted to be moved into registering alinement with an aperture in said casing to be displayed through said opening, a member mounted on the axis of said cylinder and movable relatively to said opening, said member being moved with and relatively to the periphery of said cylinder in controlling the exposure of said sections through said opening, a registering mechanism involving a plurality of registering dials arranged at one side of the cylinder, means for placing one of said dials in operative engagement with said cylinder to actuate the same when said dial reaches a predetermined, registering position to expose one of said sections in this operation, and means on said member positively engaging said cylinder in the movement imparted thereto by said dial.

2. A device of the class described comprising a casing, a cylinder rotatably supported in said casing and having circumferentially spaced sections arranged thereon and extending longitudinally thereof, each of said sections being adapted to be moved into registering alinement with an aperture in said casing to be displayed through said opening, a member mounted on the axis of said cylinder and movable relatively to said opening, said member being moved with and relatively to the periphery of said cylinder in controlling the exposure of said sections through said opening, a registering mechanism involving a plurality of registering dials, arranged at one side of the cylinder, means for placing one of said dials in operative engagement with said cylinder to actuate the same when said dial reaches a predetermined, registering position to expose one of said sections in this operation, means on said member positively engaging said cylinder in the movement imparted thereto by said dial, and means involving a manually actuated device supported in said casing adjacent one end of said member for moving said member relatively to the cylinder into registering alinement with the opening in said casing to conceal the section of the cylinder registering with said opening.

3. The combination with a registering mechanism employing a plurality of registering dials, of automatically actuated means for indicating at predetermined intervals lubricating operations to be performed on the apparatus in connection with which said mechanism is employed, said means comprising a rotatable cylinder having circumferentially spaced characterized sections, a gear at one end of the cylinder, gear segments on one of the dials of said registering mechanism adapted to intermittently register with the gear of said cylinder to intermittently move the successive sections of said cylinder into position to be exposed through an opening registering therewith, a shutter plate arranged longitudinally of the cylinder and mounted on the axis thereof, means at one end of said plate engaging the gear of said cylinder permitting collective movement of the cylinder and shutter in the operation of exposing one of the sections of the cylinder through said opening, and said shutter plate normally concealing the section of the cylinder arranged in registering alinement with said opening.

4. The combination with a registering mechanism employing a plurality of registering dials, of automatically actuated means for indicating at predetermined intervals lubricating operations to be performed on the apparatus in connection with which said mechanism is employed, said means comprising a rotatable cylinder having circumferentially spaced characterized sections, a gear at one end of the cylinder, gear segments on one of the dials of said registering mechanism adapted to intermittently register with the gear of said cylinder to intermittently move the successive sections of said cylinder into position to be exposed through an opening registering therewith, a shutter plate arranged longitudinally of the cylinder and mounted on the axis thereof, means at one end of said plate engaging the gear of said cylinder permitting collective movement of the cylinder and shutter in the operation of exposing one of the sections of the cylinder through said opening, said shutter plate normally concealing the section of the cylinder arranged in registering alinement with said opening, and other indicating means exposed through said opening independent of said cylinder and controlled by said shutter plate.

5. The combination with a registering mechanism employing a plurality of registering dials, of automatically actuated means for indicating at predetermined intervals lubricating operations to be performed on the apparatus in connection with which said mechanism is employed, said means comprising a rotatable cylinder having circumferentially spaced characterized sections, a gear at one end of the cylinder, gear segments on one of the dials of said registering mechanism adapted to intermittently register with the gear of said cylinder to intermittently move the successive sections of said cylinder into position to be exposed through an opening registering therewith, a shutter plate arranged longitudinally of the cylinder and mounted on the axis thereof, means at one end of said plate engaging the gear of said cylinder permitting collective movement of the cylinder and shutter in the operation of exposing one of the sections of the cylinder through said opening, said shutter plate normally concealing the section of the cylinder arranged in registering alinement with said opening, tensional means for moving said shutter plate independent of said cylinder, and manually actuated means for moving the shutter plate into position to be actuated by said tensional means.

6. The combination with a registering mechanism employing a plurality of registering dials, of automatically actuated means for indicating at predetermined intervals lubricating operations to be performed on the apparatus in connection with which said mechanism is employed, said means comprising a rotatable cylinder having circumferentially spaced characterized sections, a gear at one end of the cylinder, gear segments on one of the dials of said registering mechanism adapted to intermittently register with the gear of said cylinder to intermittently move the successive sections of said cylinder into position to be exposed through an opening registering therewith, a shutter plate arranged longitudinally of the cylinder and mounted on the axis thereof, means at one end of said plate engaging the gear of said cylinder permitting collective movement of the cylinder and shutter in the operation of exposing one of the sections of the cylinder through said opening, said shutter plate normally concealing the section of the cylinder arranged in registering alinement with said opening, tensional means for moving said shutter plate independent of said cylinder, and manually actuated means for moving the shutter plate into position to be actuated by said tensional means, and a pawl and ratchet for preventing movement of said cylinder in one direction.

In testimony that I claim the foregoing as my invention I have signed my name this 9th day of August, 1930.

FRANK X. REISINGER, Jr.